United States Patent
Suzuki (10) Patent No.: US 7,206,017 B1
(45) Date of Patent: Apr. 17, 2007

(54) IMAGE REPRODUCTION APPARATUS WITH PANORAMIC MODE BASED ON ASPECT RATIO

(75) Inventor: Takeshi Suzuki, Akiruno (JP)

(73) Assignee: Olympus Corporation (JP)

(*) Notice: Subject to any disclaimer, the term of this patent is extended or adjusted under 35 U.S.C. 154(b) by 0 days.

(21) Appl. No.: 09/439,890

(22) Filed: Nov. 12, 1999

(30) Foreign Application Priority Data

Nov. 13, 1998 (JP) .................... 10-323200

(51) Int. Cl.
- *G09G 5/00* (2006.01)
- *H04N 7/00* (2006.01)
- *G06F 3/00* (2006.01)
- *G06F 9/00* (2006.01)
- *G06F 17/00* (2006.01)

(52) U.S. Cl. ............ 348/36; 345/629; 345/634; 345/681; 345/684; 715/772; 715/786; 348/37; 348/38; 348/39

(58) Field of Classification Search ........... 345/684, 345/681–682, 629, 634, 636; 348/36–39; 715/771–774, 786
See application file for complete search history.

(56) References Cited

U.S. PATENT DOCUMENTS

| | | | | |
|---|---|---|---|---|
| 5,402,171 A | * | 3/1995 | Tagami et al. ............ 348/219.1 |
| 5,699,108 A | * | 12/1997 | Katayama et al. ............ 348/47 |
| 5,703,701 A | * | 12/1997 | Yamamoto et al. ......... 358/487 |
| 5,838,457 A | * | 11/1998 | Umemoto ................. 358/302 |
| 5,861,912 A | * | 1/1999 | Nanba ........................ 348/96 |
| 5,969,727 A | * | 10/1999 | Kaneko ...................... 345/508 |
| 5,973,734 A | * | 10/1999 | Anderson .................. 348/239 |
| 5,978,016 A | * | 11/1999 | Lourette et al. ............. 348/64 |
| 6,049,371 A | * | 4/2000 | Manico et al. ............... 355/41 |
| 6,057,840 A | * | 5/2000 | Durrani et al. ............. 715/786 |
| 6,097,389 A | * | 8/2000 | Morris et al. .............. 345/804 |
| 6,111,586 A | * | 8/2000 | Ikeda et al. ............... 345/433 |
| 6,141,036 A | * | 10/2000 | Katayama et al. ............ 348/47 |
| 6,147,768 A | * | 11/2000 | Norris ...................... 358/1.18 |
| 6,154,755 A | * | 11/2000 | Dellert et al. .............. 707/526 |
| 6,157,410 A | * | 12/2000 | Izumi et al. ................ 348/445 |
| 6,202,061 B1 | * | 3/2001 | Khosla et al. .................. 707/3 |
| 6,205,296 B1 | * | 3/2001 | Hamada et al. ............. 396/311 |
| 6,208,376 B1 | * | 3/2001 | Tanaka et al. ............. 348/153 |
| 6,282,330 B1 | * | 8/2001 | Yokota et al. ............. 382/309 |
| 6,307,550 B1 | * | 10/2001 | Chen et al. ................ 345/418 |
| 6,324,545 B1 | * | 11/2001 | Morag ....................... 707/202 |
| 6,346,951 B1 | * | 2/2002 | Mastronardi ............... 345/716 |
| 6,362,900 B1 | * | 3/2002 | Squilla et al. ............. 358/442 |
| 6,414,649 B2 | * | 7/2002 | Tonosaki et al. ........... 345/1.1 |
| 6,441,854 B2 | * | 8/2002 | Fellegara et al. ....... 348/333.13 |
| 6,720,987 B2 | * | 4/2004 | Koyanagi et al. ............ 348/36 |
| 2001/0028445 A1 | * | 10/2001 | Yoshida et al. ............. 355/40 |
| 2003/0117659 A1 | * | 6/2003 | Ochiai ...................... 358/302 |
| 2004/0061793 A1 | * | 4/2004 | Fellegara et al. ......... 348/231.6 |
| 2004/0218833 A1 | * | 11/2004 | Ejiri et al. ................... 382/284 |

FOREIGN PATENT DOCUMENTS

JP 1146243 5/1999

* cited by examiner

*Primary Examiner*—Ulka Chauhan
*Assistant Examiner*—Eric Woods
(74) *Attorney, Agent, or Firm*—Ostrolenk, Faber, Gerb & Soffen, LLP (57) ABSTRACT

An image reproduction apparatus includes display-image discrimination unit for discriminating a display mode (normal display, at-a-glance display, panoramic display, etc.) in which selected image data is to be displayed, display-mode setting unit for setting the display mode, which is discriminated by the display-image discrimination unit, to the image data, and display unit for displaying the image data in the display mode set by the display-mode setting unit.

4 Claims, 5 Drawing Sheets

IMAGE REPRODUCTION APPARATUS WITH PANORAMIC MODE BASED ON ASPECT RATIO

BACKGROUND OF THE INVENTION

The present invention relates to an image reproduction apparatus including an electronic album capable of storing data including image data picked up by an electronic camera and character data, such as still images, moving images, voice, and text, in an album recording medium and then reproducing and displaying the data at any time.

Figure 6A:
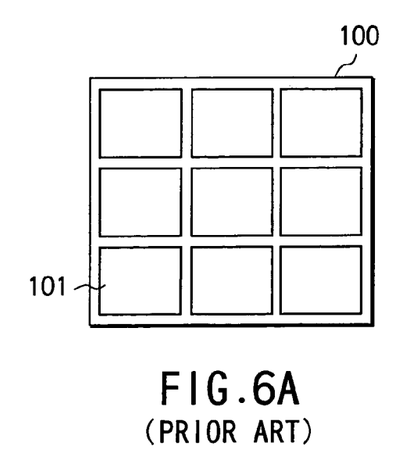
FIGS. 6A and 6B are views showing a prior art electronic album in order to describe problems thereof.
Figure 6B:
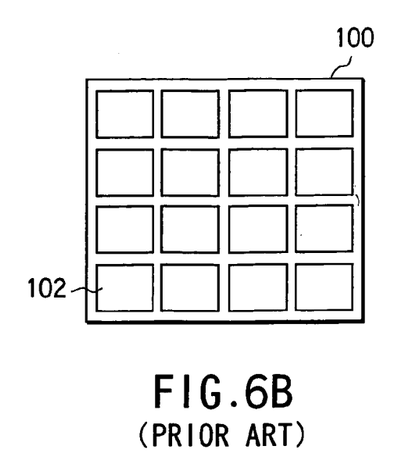

In a prior art electronic album, a display area (screen) 100 is split into 9 (3×3) parts in which a plurality of images 101 of a fixed size are displayed as shown in FIG. 6A, or 16 (4×4) parts in which a plurality of images 102 of a fixed size are displayed as shown in FIG. 6B.

The prior art electronic album has no means for displaying panoramic image data easily and accurately.

The foregoing prior art electronic album is thus of no interest to a user because an at-a-glance display of plural images is fixed and lacking in diversity. Furthermore, a user cannot manage to display panoramic image data, and it is difficult for him or her to use a special panoramic image effectively.

BRIEF SUMMARY OF THE INVENTION

Accordingly, the object of the present invention is to provide an image reproduction apparatus including an electronic album having the advantages that a plurality of images can be displayed at sight in a given layout and a panoramic image can be displayed easily and accurately.

To attain the above object, the image reproduction apparatus of the present invention has the following feature in constitution. The other features will be clarified later in the Description of the Invention.

An image reproduction apparatus according to the present invention, comprises display-image discrimination means for discriminating a display mode (normal display, at-a-glance display, panoramic display, etc.) in which selected image data is to be displayed, display-mode setting means for setting the display mode, which is discriminated by the display-image discrimination means, to the image data, and display means for displaying the image data in the display mode set by the display-mode setting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiment

Figure 1:
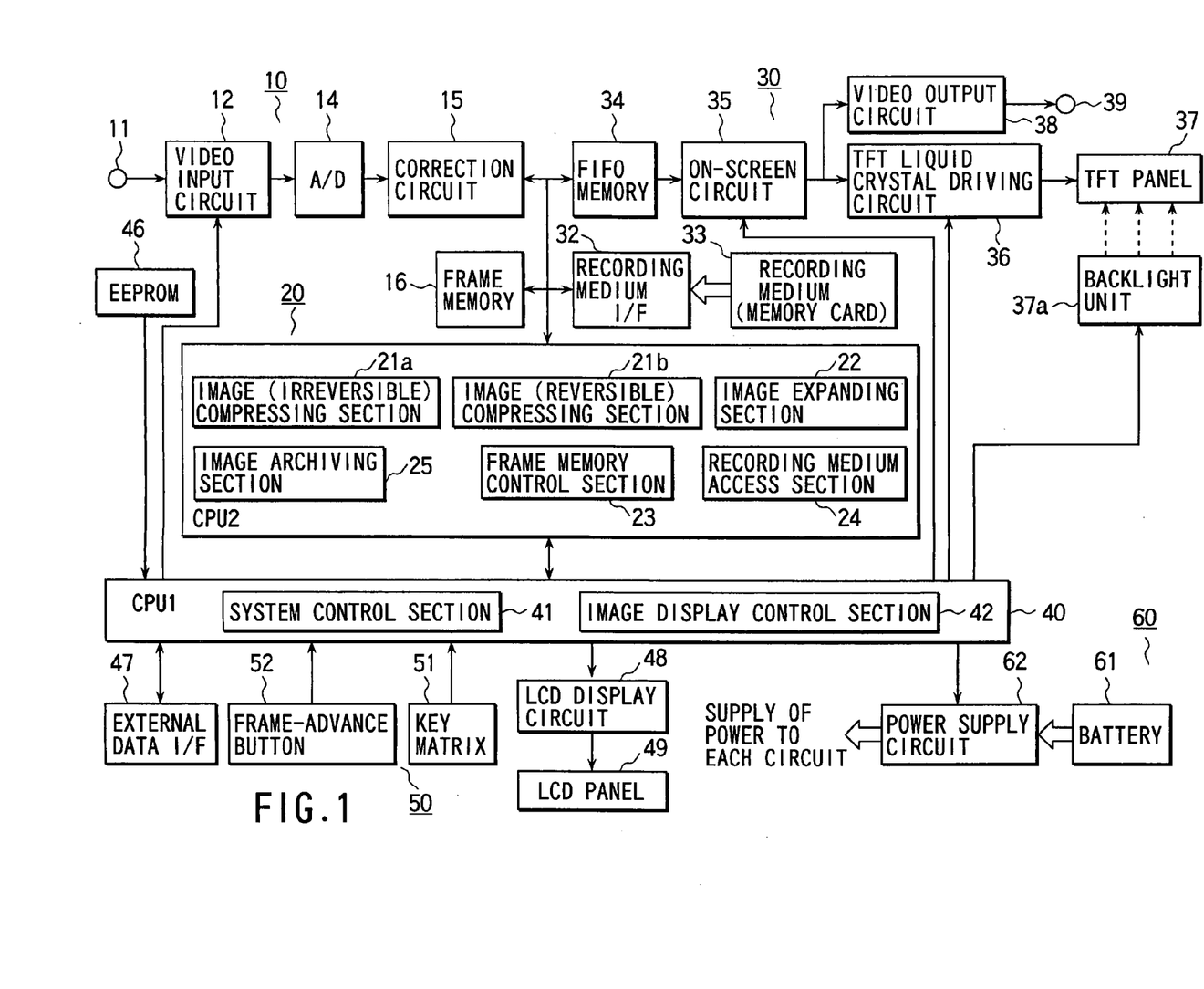
FIG. 1 is a block diagram showing an electronic album as an image reproduction apparatus according to an embodiment of the present invention.

FIG. 1 is a block diagram showing an electronic album as an image reproduction apparatus according to an embodiment of the present invention. The electronic album is constituted chiefly of an image input section 10, an image data processing section 20, an image data recording/display section 30, a control section 40, an operation section 50 and a power supply section 60.

The image input section 10 includes a video input terminal 11, a video input circuit 12, an A/D conversion circuit 14, a correction circuit 15 and a frame memory 16. In the image input section 10, image data input to the video input terminal 11 is received by the video input circuit 12 and converted to a digital signal in the A/D conversion circuit 14. The digital signal is brought into white balance and gamma-corrected by the correction circuit 15, and then image data items are stored in the frame memory 16 one by one.

The image data processing section 20 is constituted of a CPU 2 including an image (irreversible) compressing section 21a, an image (reversible) compressing section 21b, an image expanding section 22, a frame memory control section 23, a recording medium access section 24, and an image archiving section 25.

The "archiving" is a function of collecting a plurality of image data items, which are stored in different files, in a single file and thus effectively using an unused recording area of each of the files thereby to compress all the data items again.

The image data processing section 20 compresses the image data items, which are stored in the frame memory 16, one by one and stores them in an album recording medium 33 of the image data recording/display section 30. The section 20 also expands the image data items stored in the recording medium 33 and sends them to an FIFO memory 34 of the section 30. Further, the section 20 gains access to the recording medium 33 of the section 30.

The image data recording/display section 30 includes a recording medium I/F 32, an album recording medium (e.g., a memory card) 33, a displaying FIFO memory 34, an on-screen circuit 35, a TFT liquid crystal driving circuit 36, a TFT panel 37, a TFT panel illuminating backlight unit 37a, a video output circuit 38, and video output terminal 39. The section 30 records the image data, which is stored in the frame memory 16, in the album recording medium 33, and reads out the image data therefrom and transmits it to a display system (34, 35, 36, 37, 37a, etc.) for displaying an image.

The image data transmitted to the display system is stored temporarily in the FIFO memory 34 and read out therefrom. Then, the image data is converted to a video signal, and a title and the other characters are added thereto in the on-screen circuit 35. This video signal is supplied to the TFT panel 37 through the TFT liquid crystal driving circuit 36 and the panel 37 is illuminated by the backlight unit 37a to display the video signal as a subject image, while the video signal is output from the video output terminal 39 via the video output circuit 38.

The control section 40 is constituted chiefly of a CPU 1 including a system control section 41 and an image display control section 42 to control the overall system including the image input section 10, image data processing section 20 and image data recording/display section 30.

The control section 40 is provided with an EEPROM 46 for storing information for initializing the electronic album, an external data I/F 47 for exchanging data with a personal computer and the like, and an LCD circuit 48 for operating an LCD panel 49.

The operation section 50 is constituted mainly of a key matrix 51 and a frame-advance button 52 which are connected to the control section 40 and used for operating various switches to operate the album.

The power supply section 60 mainly includes a battery 61 (e.g., four batteries of 1.5V) to apply a given voltage to the respective sections through a power supply circuit 62.

Figure 2A:
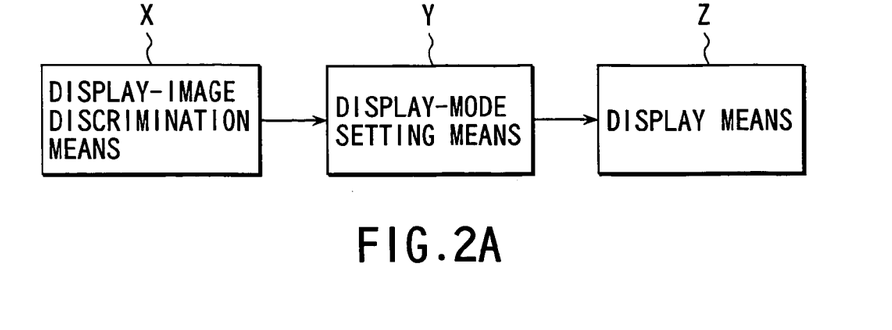
FIG. 2A is a block diagram showing means X, Y and Z of an image display control section of the electronic album according to the embodiment of the present invention.
Figure 2B:
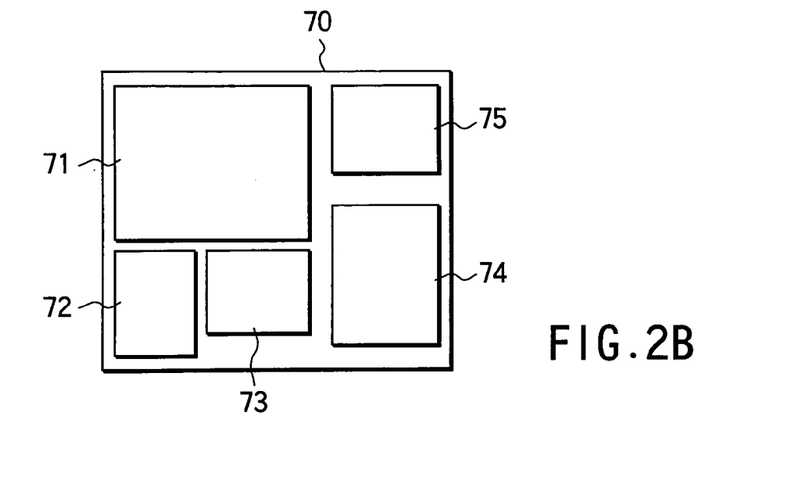
FIG. 2B is a view showing an example of a layout of a plurality of images displayed at sight by the image display control section of the electronic album according to the embodiment of the present invention.
Figure 2C:
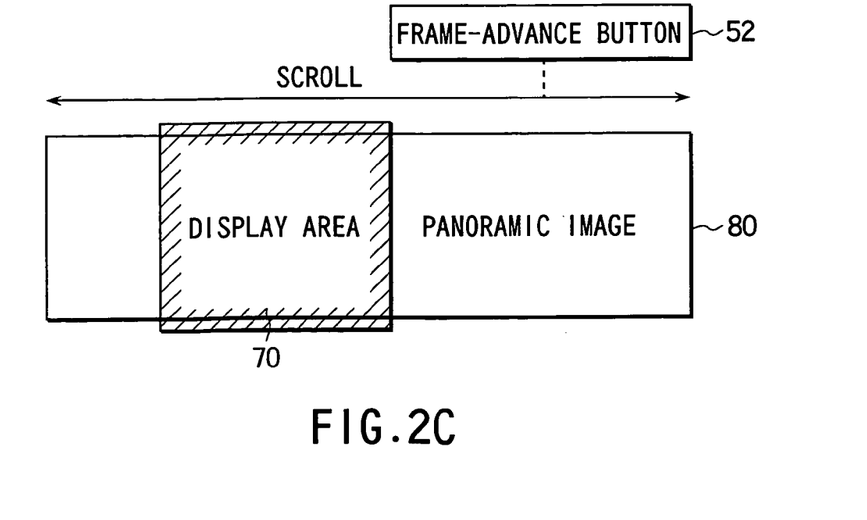
FIG. 2C is a view illustrating a scroll operation for displaying a panoramic image by the image display control section of the electronic album according to the embodiment of the present invention.

FIGS. 2A to 2C illustrate the image display control section 42 of the electronic album of the present invention. Referring to FIG. 2A, the section 42 includes a display-image discrimination means X for discriminating a display mode in which selected image data should be displayed, a display-mode setting means Y for setting a display mode discriminated by the display-image discrimination means X in the image data, and a display means Z for displaying the image data in the display mode set by the display-mode setting means Y.

The display-image discrimination means X discriminates whether the selected image data should be displayed normally, at a glance, or panoramically. This means X includes a means for, when the aspect ratio of an image to be displayed differs from that of a display area of a display device, discriminating that the image is a panoramic image.

The display-mode setting means Y sets a display mode discriminated by the display-image discrimination means X, such as a "normal display" mode, an "at-a-glance display" mode and a "panoramic display" mode, in the image data.

If the means X discriminates that the image data should be displayed at a glance, all images to be displayed are laid out within a display area (display screen) 70, as shown in FIG. 2B, and, in this case, a location and size are set appropriately for each of images 71 to 75.

If the means X discriminates that the image data should be displayed panoramically, a panoramic image 80 is scrolled and displayed in the display area 70 as shown in FIG. 2C.

The display-mode setting means Y includes a means for allowing the above scroll operation to be performed by the frame-advance button 52.

The display means Z includes a means for performing various display operations (described later) by controlling the on-screen circuit 35 and TFT liquid crystal driving circuit 36 in accordance with the contents set by the display-mode setting means Y or in response to a command from the system control section 41.

Figure 3:
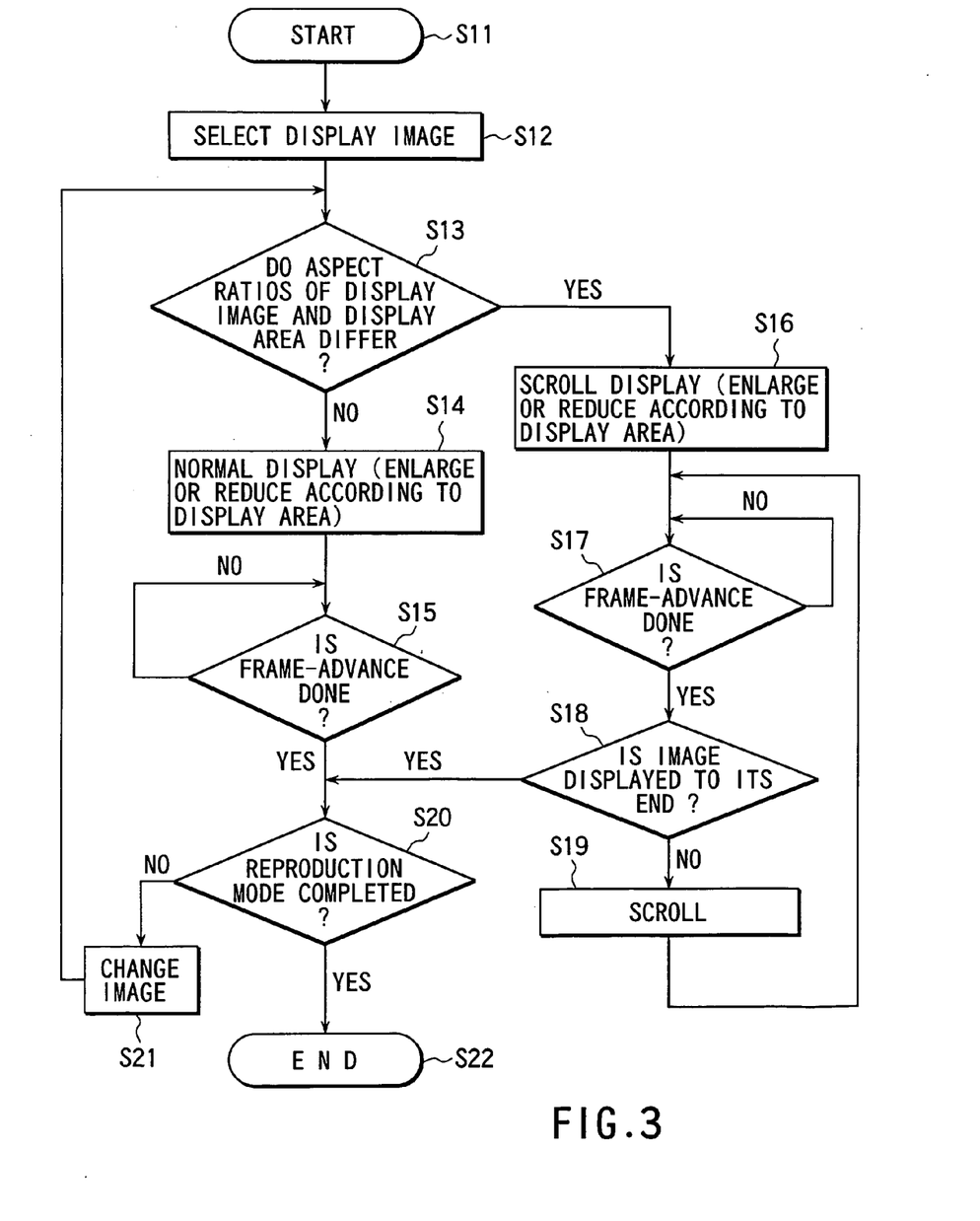
FIG. 3 is a flowchart showing operations of normal display and scroll display in the electronic album according to the embodiment of the present invention.

FIG. 3 is a flowchart showing an operation of the image display control section 42 or an operation for normal display or scroll display performed by the display-mode setting means Y and display means Z based on a discrimination result of the display-image discrimination means X.

[Step S11]
An image display operation is started.

[Step S12]
A display image is selected.

[Step S13]
It is discriminated whether the aspect ratios of the display image and display area differ or not. If NO (not differ), the flow advances to step S14. If YES, it goes to step S16.

[Step S14]
When the aspect ratios are the same, the image is displayed normally. However, it is enlarged or reduced in accordance with the display area.

[Step S15]
It is discriminated whether a frame-advance (scroll) operation has been performed or not. If NO, it is discriminated again whether the frame-advance operation has been performed. The same operation is repeated until the discrimination result is YES. When it is YES, the flow moves to step S20.

[Step S16]
If the aspect ratios differ from each other, the image is discriminated as a panoramic image, and the scroll display is carried out. However, the image is enlarged or reduced in accordance with the display area.

[Step S17]
It is discriminated whether a frame-advance operation has been performed or not. If NO, it is discriminated again whether the frame-advance operation has been performed. The same operation is repeated until the discrimination result is YES. When it is YES, the flow moves to step S18.

[Step S18]
It is discriminated whether the panoramic image is displayed to its end portion. If the discrimination result is NO, the flow goes to step S19. If YES, it advances to step S20.

[Step S19]
The scroll operation is continued, and the flow returns to step S17.

[Step S20]
It is discriminated whether a reproduction mode is terminated or not. If NO, the flow advances to step S21. If YES, it shifts to step S22.

[Step S21]
The image is changed, and the flow returns to step S13.

[Step S22]
A series of image display operations is completed.

Figure 4A:
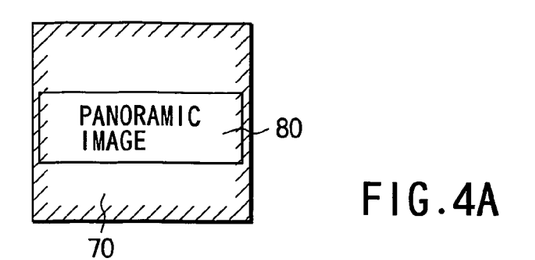
FIGS. 4A to 4C are views of specific examples of display modes for displaying a panoramic image in the electronic album according to the embodiment of the present invention.
Figure 4B:
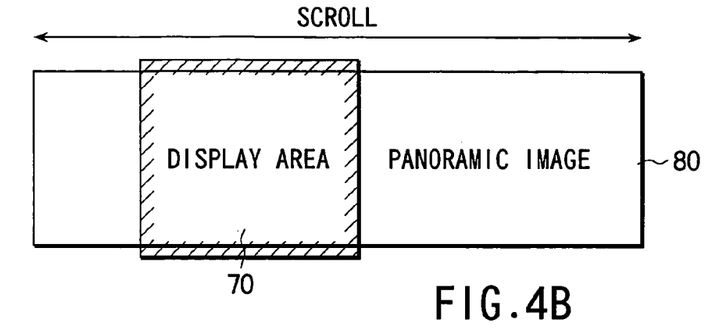
Figure 4C:
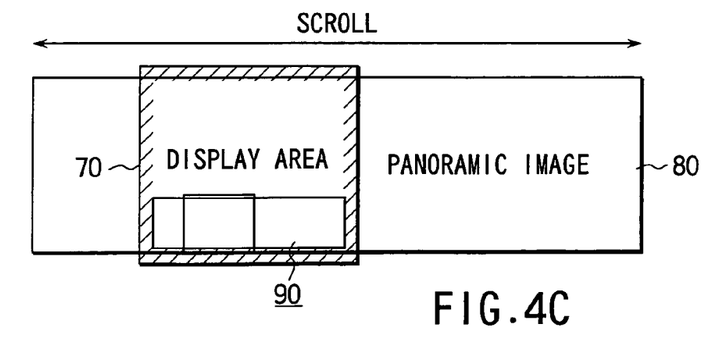

FIGS. 4A to 4C illustrate specific examples of display operation modes for displaying a panoramic image.

FIG. 4A shows an entire reduced-image display mode in which a panoramic image 80 is reduced as it is and the reduced panoramic image 80 is displayed at once within the display area 70. According to this display mode, the panoramic image is displayed on a single screen and thus can be seen in its entirety.

FIG. 4B illustrates a scroll display mode in which a panoramic image 80 is scrolled in a normal size and displayed in sequence within the display area 70. In this mode, each portion of the panoramic image 80 is displayed in a full size within the display area 70 and thus can be recognized exactly.

FIG. 4C shows a superimposed scroll display mode in which when a panoramic image 80 is scrolled and displayed in a normal size, a superimposed display 90 is performed in the display area 70 to indicate which portion of the image 80 is currently displayed therein. In this mode, the superimposed display 90 allows a user to confirm which portion of the panoramic image is currently displayed (e.g., which image is displayed), at first sight. In other words, the superimposed displayed 90 constitutes an indicator portion that indicates what frame of the panoramic image is being shown. Consequently, the user need not perform any unnecessary operation and the apparatus is improved in operability.

Figure 5A:
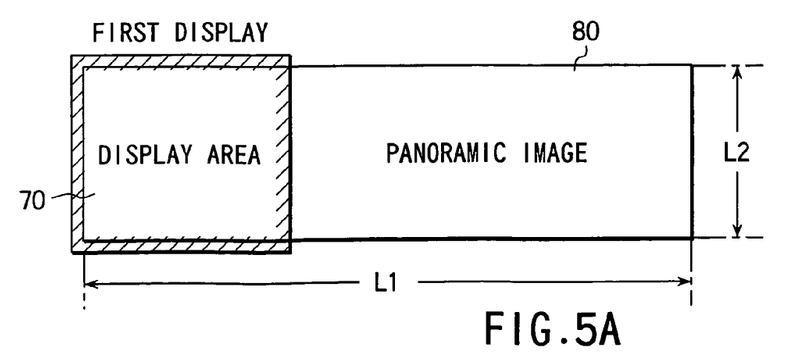
FIGS. 5A to 5C are views of specific example of steps for splitting a panoramic image in the electronic album according to the embodiment of the present invention.
Figure 5B:
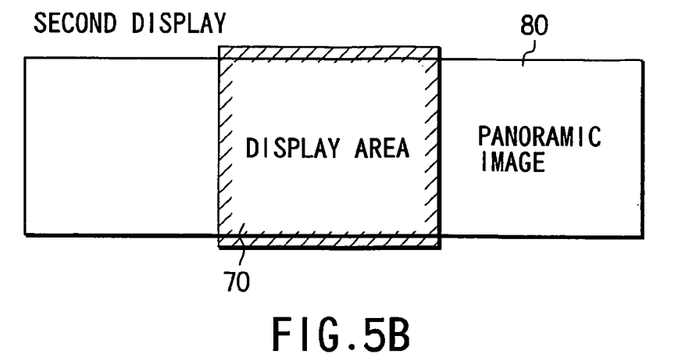
Figure 5C:
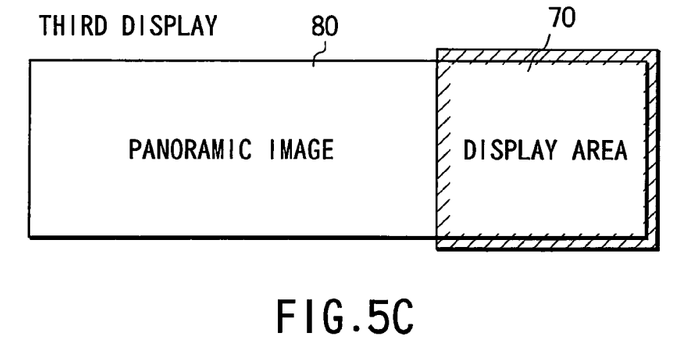

FIGS. 5A to 5C are views showing a divided-image stepping display mode. In this mode, when the aspect ratio of a panoramic image 80 (length L1 in the lengthwise direction to length L2 in the widthwise direction) is plural times greater than that of the display area 70 (e.g., when the former ratio 12:3 is three times greater than the latter ratio 4:3), the panoramic image 80 is divided into three portions of a leading-edge portion, an intermediate portion and a trailing-edge portion in its longitudinal direction with each of the three portions corresponding to the display area 70 and, as shown in FIGS. 5A to 5C, these portions are advanced frame by frame and displayed step by step.

Modifications

The image reproduction apparatus according to the above embodiment can be modified as follows:

1) The apparatus may have a means for switching between the display modes shown in FIGS. 4A and 4B or a means for switching among the three display modes shown in FIGS. 4A, 4B and 4C. The apparatus can thus be improved in usability.

2) When the aspect ratio of an image to be displayed is greater than that of the display area 70, the image can be divided and displayed over plural times automatically. Since, in this mode, one image is divided and displayed plural times, it can be reproduced quickly without reducing an amount of information that the image originally has.

3) The apparatus may have a means for switching between a frame-advance display mode in which an image is advanced frame by frame and displayed and a scroll display mode in which an image is scrolled and displayed, irrespective of whether the image is a panoramic one or not. These two display modes can be used selectively in accordance with a user's preference; thus, the apparatus can be improved further in usability.

4) The apparatus may have a single/overall image display mode switching means for switching between a single-image display mode and an overall-image display mode when a panoramic image is displayed in the display area 70. The former display mode includes a representative-image display for displaying only the central part of the panoramic image as a representative and a single-image display, such as an entire reduced-image display, for displaying the reduced panoramic image in the display area 70. The latter display mode includes a divided-image stepping display for advancing the panoramic image frame by frame and displaying it step by step and an overall-image display, such as a scroll display, for scrolling the panoramic image from one end to the other end and displaying it continuously.

5) The foregoing embodiment is directed to an electronic album for storing data containing image data and character data together in a recording medium. However, the electronic album can be incorporated in an electronic camera and, in this case, the recording medium can be detached from the camera.

Features of the Embodiment and Modifications

[1] An image reproduction apparatus according to the above embodiment, comprises display-image discrimination means (X) for discriminating a display mode (normal display, at-a-glance display, panoramic display, etc.) in which selected image data is to be displayed, display-mode setting means (Y) for setting the display mode, which is discriminated by the display-image discrimination means (X), to the image data, and display means (Z) for displaying the image data in the display mode set by the display-mode setting means (Y).

[2] In the image reproduction apparatus according to the above item [1], the display-mode setting means (Y) includes means for appropriately setting a location and size of each image data to be displayed and (as shown in FIG. 2B) laying out all images within a designated display area (70) when the display-image discrimination means (X) discriminates that the image data is to be displayed at a glance.

The foregoing image reproduction apparatus allows a user to consciously designate a visual size and location of image data to be displayed, regardless of the number of pixels or the capacity of the image data, when the image data is displayed at a glance. The apparatus can thus be improved further in usability.

[3] In the image reproduction apparatus according to the above item [1], the display-image discrimination means (X) includes means for discriminating that the image data is a panoramic image (80) when the aspect ratio of the image data differs from that of a display area (70) of a display device.

[4] In the image reproduction apparatus according to the above item [1], the display-mode setting means (Y) includes means for performing a scroll operation of a panoramic image (80) in a display area (70) (as shown in FIG. 2C) using a frame-advance button (52) when the display-image discrimination means (X) discriminates that the image data is to be displayed panoramically.

[5] In the image reproduction apparatus according to the above item [4], the display-mode setting means (Y) includes means for, when the frame-advance button is operated again after the scroll operation of the panoramic image (80) is completed, starting a scroll operation of a subsequent panoramic image (80) automatically.

The foregoing apparatus allows a plurality of panoramic images to be displayed with efficiency.

[6] In the image reproduction apparatus according to the above item [1], the display means (Z) includes means for switching a scroll display mode for scrolling a panoramic image and a frame-advance display mode for advancing images frame by frame.

In the above apparatus, the two display modes can be used selectively in accordance with a user's preference.

[7] In the image reproduction apparatus according to the above item [1], the display means (Z) includes means for switching an entire reduced-image display mode (FIG. 4A) in which a panoramic image (80) is reduced as it is and the reduced panoramic image (80) is displayed at once within a display area (70) and a scroll display mode (FIG. 4B) in which a panoramic image (80) of a normal size is scrolled and displayed.

In the foregoing apparatus, if the reduced panoramic image (80) is displayed at once in the display area (70), the entire panoramic image (80) can be confirmed at first sight. If the scroll display mode is selected, the display area (70) can be utilized considerably effectively to display each image in a full size and confirm it exactly.

[8] In the image reproduction apparatus according to the above item [1], the display means (Z) includes means for clearly displaying whether an image displayed in a display area (70) is part or all of the image data.

Since, in this apparatus, the location and status of the image currently displayed in the display area (70) can be recognized, a user can prevent from missing display data that he or she thinks really necessary.

[9] In the image reproduction apparatus according to the above item [1], the display means (Z) includes means for performing a superimpose display to show which portion of a panoramic image (80) is currently displayed in a display area (70) (e.g., to show which image is displayed) when the panoramic image (80) is scrolled in a normal size.

In the above image reproduction apparatus, when part of a panoramic image (80) is displayed, a user knows at first sight which part of the original image data it is. The user therefore need not perform any unnecessary operation and the apparatus is improved in operability for image observation.

[10] In the image reproduction apparatus according to the above item [1], the display means (Z) has a divided-image stepping display mode in which a panoramic image (80) is divided into a plurality of (three) areas and the areas are advanced frame by frame and displayed step by step (e.g., the leading-edge portion is displayed first as shown in FIG. 5A, an intermediate portion is displayed secondly as shown in FIG. 5B, and a trailing-edge portion is displayed thirdly as shown in FIG. 5C) when an aspect ratio (L1:L2 in FIG. 5A) of the panoramic image (80) is plural times larger than that of a display area (70) (e.g., when the aspect ratio 12:3 of the panoramic image (80) is three times as large as that 4:3 of the display area (70)).

When the above apparatus is set in the divided-image stepping display mode, one image is displayed over plural times. Therefore, the whole image can be reproduced and displayed very quickly without reducing an amount of information that the image originally has.

[11] The image reproduction apparatus according to the above item [1] further comprises a single/overall image display mode switching means for, when a panoramic image (80) is displayed in a display area (70), switching between a single-image display mode including a representative-image display for displaying only the central part of the panoramic image as a representative and a single-image display, such as a reduced-image display, for displaying the reduced panoramic image in the display area (70), and an overall-image display mode including a divided-image stepping display for advancing the panoramic image frame by frame and displaying it step by step and an overall-image display, such as a scroll display, for scrolling the panoramic image from one end to the other end and displaying it continuously.

In the foregoing image reproduction apparatus, the single-image display mode has only to be selected for the purpose of retrieval since an amount of information is small and a frame-by-frame advance is fast, while the overall-image display mode has only to be selected for the purpose of appreciation since an image should be displayed without reducing an amount of information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An electronic camera comprising:
   a recording medium removable from the camera, in which a plurality of images are recorded;
   a display panel configured to display an image selected from the recording medium;
   an image discrimination circuit configured to determine whether the selected image represents a panoramic image, the determination being based on an aspect ratio of the selected image;
   a display-mode setting circuit configured to set a display-mode based on the result of the determination by the image discrimination circuit, a display circuit configured to cause the selected image to be displayed on the display panel according to the display-mode set in the display-mode setting circuit,
   wherein when
      the image discrimination circuit determines the selected image as representing a panoramic image,
      the display-mode setting circuit sets a panoramic display-mode, and the display circuit displays on the display panel a selected frame of the panoramic image;
   a frame-advance button for advancing the plurality of frames of the panoramic image into the display panel; and
   a superimpose circuit configured to superimpose an indicator on the display panel to indicate which of said plurality of frames of the panoramic images is being displayed, the indicator being movable on a representation of the panoramic image on the display panel.

2. The electronic camera according to claim 1, wherein the indicator is rectangular and is displayed along a bottom edge of the display panel.

3. An electronic camera comprising:
   a recording medium removable from the camera, in which a plurality of images are recorded;
   a display panel configured to display an image selected from the recording medium;
   an image discrimination circuit configured to determine whether the selected image represents a panoramic image, the determination being based on an aspect ratio of the selected image;
   the display-mode setting circuit configured to set a display-mode based on the result of the determination by the image discrimination circuit;
   a display circuit configured to cause the selected image to be displayed on the display panel according to the display-mode set in the display-mode setting circuit;
   wherein when
      the image discrimination circuit determines the selected image data as representing a panoramic image,
      the display-mode setting circuit sets a panoramic display-mode, and the display circuit divides the selected panoramic image into a plurality of areas, and displays on the display panel a selected area of the divided panoramic image;

a frame-advance button for controlling the display circuit's step by step display of the panoramic image on the; and a superimpose circuit for superimposing an indicator to show which of said plurality of frames of the panoramic image is displayed on the display panel, the indicator being movable along a longitudinal direction of display panel.

4. The electronic camera according to claim 3, wherein the indicator is rectangular and is displayed along the bottom edge of the display panel.

* * * * *